E. R. HUMPHREY.
ELECTROMAGNETIC AIR BRAKE VALVE.
APPLICATION FILED FEB. 6, 1918.

Patented Sept. 17, 1918.

INVENTOR
EDWARD R. HUMPHREY,

E. R. HUMPHREY.
ELECTROMAGNETIC AIR BRAKE VALVE.
APPLICATION FILED FEB. 6, 1918.

1,279,113.

Patented Sept. 17, 1918.
3 SHEETS—SHEET 2.

WITNESSES

INVENTOR
EDWARD R. HUMPHREY.

BY

ATTYS.

WITNESSES

INVENTOR
EDWARD. R. HUMPHREY.
BY
ATTYS.

UNITED STATES PATENT OFFICE.

EDWARD RICHMOND HUMPHREY, OF VICTORIA, BRITISH COLUMBIA, CANADA, ASSIGNOR TO SAFETY FIRST AIR BRAKE COMPANY (CANADA) LIMITED, OF VICTORIA, BRITISH COLUMBIA, CANADA, A CORPORATION OF BRITISH COLUMBIA.

ELECTROMAGNETIC AIR-BRAKE VALVE.

1,279,113.     Specification of Letters Patent.     Patented Sept. 17, 1918.

Application filed February 6, 1918. Serial No. 215,650.

*To all whom it may concern:*

Be it known that I, EDWARD RICHMOND HUMPHREY, a subject of the King of Great Britain, and resident of the city of Victoria, Province of British Columbia, Dominion of Canada, have invented certain new and useful Improvements in Electromagnetic Air-Brake Valves, of which the following is a specification.

This invention relates to improvements in electromagnetic air brake valves, of the type in which the air passing to and from the brake cylinder is controlled by electro-magnetic means independently of the usual triple valve control.

The general objects of the invention are to improve and simplify the valve, to reduce the number of working parts, and to enable the various parts to better perform the functions required of them.

A more particular object of the invention is to enable the control of the air for service and emergency application and release by the use of only two magnets.

A further object is to regulate the supply of air to the brake cylinders in service application independently of the wear or lift of the service valve.

Further objects are to enable all valves and operative parts to be removed without breaking or disturbing the electrical connection, and to arrange the electrical connections so that only one magnet is operative at any one time.

With these and other objects in view, the invention consists essentially of the improved construction hereinafter described in detail in the following specification and accompanying drawings.

In the drawings.

In the drawings, like characters of reference indicate corresponding parts in all the figures.

Figure 1:
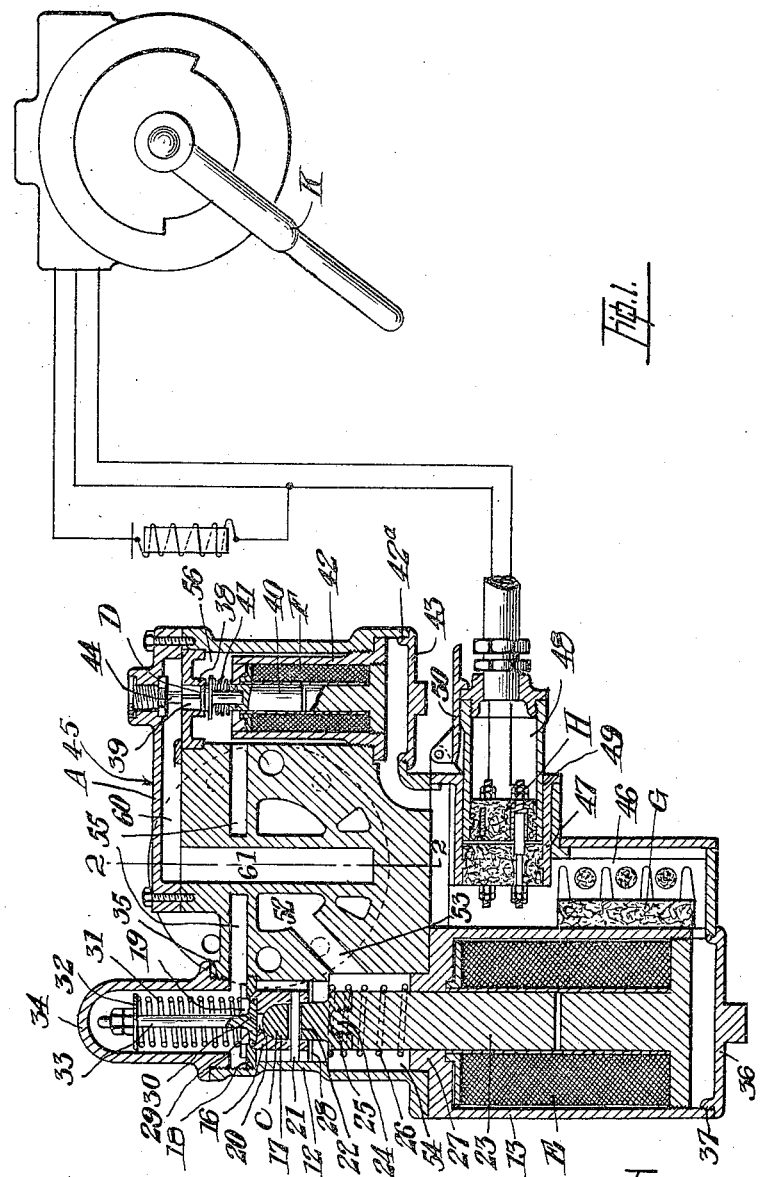
Figure 1 is a section on the line 1—1 of Fig. 2.
Figure 3:
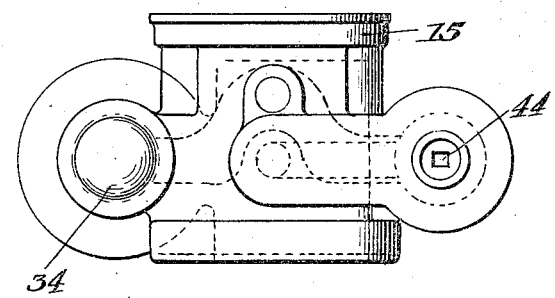
Fig. 3 is a plan view of the device.

Referring to the drawings, A represents a Westinghouse triple valve of usual construction, and B the casing of my improved valve. The triple valve includes the usual piston 10 and feed groove 11. The casing B may be conveniently formed in two sections 12 and 13 suitably bolted or otherwise connected together, and of the shape and size to contain the working parts, and being formed with interior walls forming passageways or ports in the manner hereinafter indicated.

The casing B is provided with suitable attaching flanges 14 and 15 which will enable it to be inserted between, and bolted to the triple valve at one side, and to the brake cylinder at the other.

Within the casing B is mounted an application valve C and a release valve D, both of which are electromagnetically controlled in a manner hereinafter more fully set forth and described.

The application valve C is of the lifting type and formed of two sections or parts 16 and 17, which are adapted to control respectively the emergency and service application of the brakes. The part 16 is adapted to fit against a valve seat 18 through the port 19 of which the air may pass to the brake cylinder for both service and emergency applications.

The part 16 is also provided with a port 20 for service application formed with a suitable surrounding valve seat, against which the part 17 is adapted to fit.

Limited relative movement of the parts 16 and 17 is provided for by means of a striking pin 21 on the part 16 which extends through a slot 22 in the part 17.

Movement of the application valve C as a whole is controlled by an electromagnet E having a core or armature 23 which is connected to the part 17, as by means of a threaded projection 24 which extends into a threaded socket 25 in the part 17.

The core 23 and the application valve carried thereby is normally held in raised position with the valve seat by means of a spiral spring 26 extending from the wall 27 in the casing to a cross bar 28 carried by the part 17.

The passage of air to the port 20 on the service application is designed to be regulated by means of a regulating member or cap 29 which has threaded engagement with the walls of the port 20, and is itself formed with a port 30 the size of which regulates the flow of air to the brake cylinders, notwithstanding the wear or lift of the valve part 17.

The pressure of the part 16 of the valve against its seat must be greater than that of the part 17 in order to cause the latter part to move first, and to effect this I provide a compression spring 31 which extends from the seat to a washer or ring 32 mounted on a stem 33 extending from the cap 29. This stem and spring may conveniently be inclosed by a removable cap 34 having screw threaded engagement with a suitable opening 35 in the casing, the cap when removed permitting the removal of the valve C and core 23 without in any way disturbing or affecting the electrical connections of the magnet E.

Removal of the magnet itself is provided for by means of a cap 36 having screw threaded engagement with an opening 37 in the casing in alinement with the magnet.

The release valve D is adapted to seat against a suitable seat 38 which has a release port 39 therein. This valve D is electromagnetically controlled by an electro-magnet F which controls a core or armature 40 normally maintained in raised position and with the valve seated by means of a compression spiral spring 41 extending between the valve and the casing 42 which surrounds the magnet.

This casing 42 has screw threaded engagement with the walls of the casing A and may when necessary be withdrawn as a whole through an opening 42ª in the casing, said opening being normally closed by a cap 43 which has threaded engagement with the side walls of the opening, or the valve D may be removed by removing the cover 60 when the seat 38 may be withdrawn through the opening thus effected without breaking any electrical connections.

To enable the release valve to be held open when it is desired to operate the air brakes independently of the electrical control as hereinafter described, a controlling pin 44 is provided having screw-threaded engagement with a cap 45 which forms a removable closure for a portion of the top of the casing A.

The pin 44 is designed to be adjusted in position whereby it may be moved into such position that it will hold the valve D in open position.

To facilitate the electrical connections in the train, a fuse box G of any well known construction is provided in a compartment 46 of the lower part of the casing. A two part electrical connector H is also provided, having one part 47 permanently mounted in the casing and having the other part 48 withdrawable through the opening 49 in the casing, which opening is adapted to be closed when the connecting part is withdrawn by means of a hinged door 50.

Figure 4:
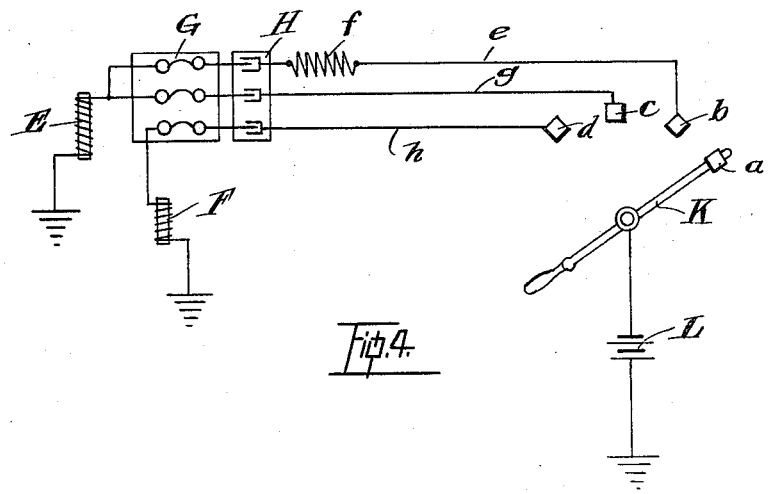
Fig. 4 is a diagrammatic view of the electrical connections.
Figures 5, 6:
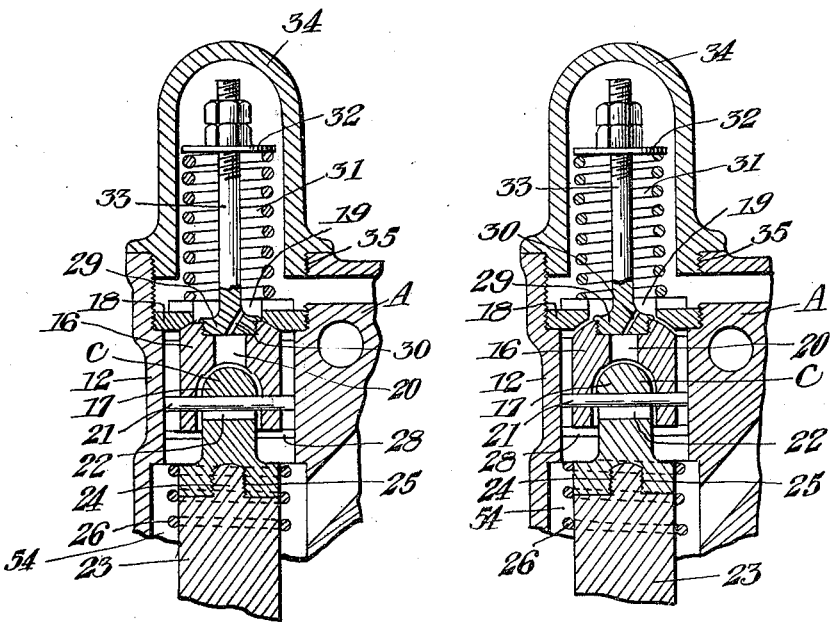
Fig. 5 is a sectional detail showing the application of the valve for service application.
Fig. 6 is a sectional view of the application valve in position for emergency application.

The electrical connections are shown in detail in Fig. 4, in which K represents the engineer's switch having four contact points $a, b, c$ and $d$. The contact $a$ represents the position in which none of the magnets are energized. Contact $b$ is connected with a circuit $e$ which includes a resistance $f$, the connector H the fuse box G, the magnet E, and a source of power L. It will be understood that one terminal of winding on the magnet E is grounded, while the switch lever K is connected to the source of power L which may be a battery, one side of which is also grounded as indicated.

The contact $c$ includes a circuit $g$ which extends through the connector H, fuse box G to the magnet E, but which circuit does not include any resistance. The contact $d$ is conected to a circuit $h$ which includes the connector H, fuse box G and release magnet F.

When the device is in use, there are three positions of the valve one each for service application, emergency application and for release, respectively. When it is desired to make a service application the lever K is moved into engagement with the contact $b$ which completes the circuit $e$ energizing the magnet E to a certain extent, drawing the core 23 downwardly, moving the part 17 of the valve C downwardly opening the port 20. The air enters the Westinghouse triple valve A in the usual way, passes the piston 10 by way of groove 11 and after passing through the triple valve enters passage 52, thence through passage 53 into chamber 54.

From chamber 54 it passes around the magnet through the port 20, the passage 55 into chamber 56 through passage 57 and out to the brake cylinder (not shown).

Figure 2:
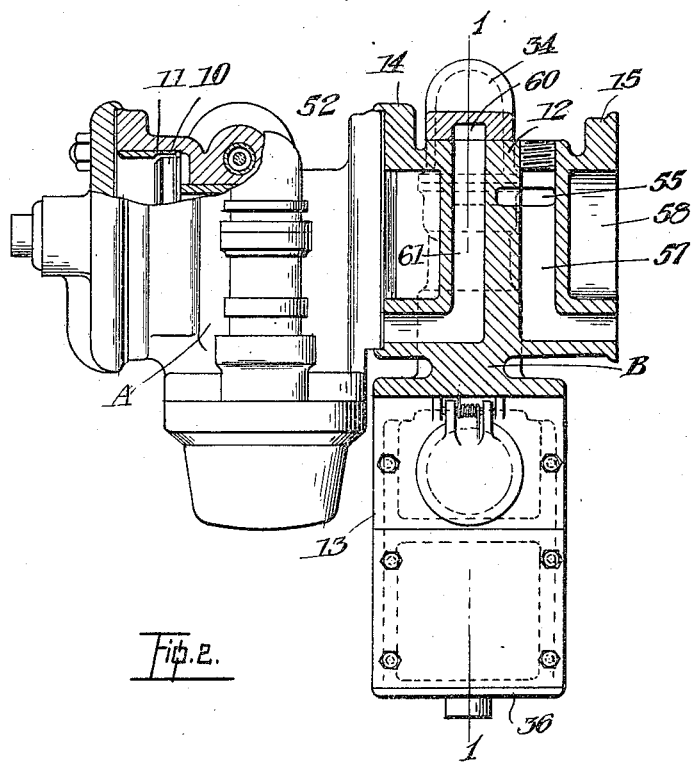
Fig. 2 is a side elevation partly broken away, with the standard Westinghouse valve shown in part side elevation and in part a section on the line 2—2 of Fig. 1.

The course of the emergency application will be the same as that just described, with the exception that the emergency ports 19 will be open permitting a more rapid application of the brake. It will be observed that the air in passing to the auxiliary tank (not shown) after passing into the passage 52 leaves the device by the right hand end on Fig. 2, through the passageway 58 which communicates directly with the auxiliary tank, from which the air enters the passage 53.

To apply the emergency brake, the lever K is moved to the contact $c$ when the magnet E being energized to a greater extent will lift the portion 16 of the valve C, opening the emergency port and permitting an emergency application of the brakes.

To release the brakes the lever K is moved to engage with the contact $d$ when the release magnet F is energized, the magnet E being deënergized thus permitting the application valve C to close.

In the release position the air is vented back through the passages 57 and 55, the valve D into the passage 60, thence through passage 61 into the triple outlet which is open to the atmosphere, when the triple is in release position, it being understood that the making of an application by the electrically controlled valve does not move the triple valve from its released position.

When it is desired to make an application by use of the air triple valve, its operation is as usual, the air leaving the triple by way of passage 61 into passage 60, past valve D into chamber 56 through passage 55 and thence through passage 57 to the brake cylinder.

The auxiliary tank is charged the same as in the case of the electrical application. The release takes place through the same passages as in the electrical operation, the valve D being held open by screwing down the pin 44 as previously explained. This is only necessary when there is no electrical source of power to supply the magnet F.

It will be observed that all the valves used in the device are lifting valves which enable the ports to very rapidly open and the air to pass through very quickly and without hindrance.

It will be observed that the use of the spring 31 prevents the emergency valve being opened until a given pull is exerted by the electromagnet E. This in effect means that the spread in voltage between the point at which the magnet will operate the valve for service application and the point at which it will operate it for emergency application is regulated by the strength of the spring.

It is also regulated by the difference in size of the emergency valve as compared to the service valve. It would be quite possible to increase the size of the emergency valve to such an extent that the air pressure on the valve would be equivalent to that produced by the valve as illustrated with the addition of the spring.

It is not desirable however, and one of the important advantages in the use of the spring is that it increases the resistance to opening of the emergency valve, without increasing the diameter thereof.

As many changes could be made in the above construction, and many apparently widely different embodiments of my invention within the scope of the claims, constructed without departing from the spirit or scope thereof, it is intended that all matter contained in the above specification and accompanying drawings be interpreted as illustrative, and not in a limiting sense.

What I claim as my invention is:

1. In a pneumatic electric air brake, valve means adapted in one position to effect a service application of the brakes, and in another position to effect an emergency application, in combination with electromagnetic means adapted when energized to a certain extent to move the valve means to service application position, and when energized to a different extent to move said valve means to emergency application position.

2. A pneumatic electric air brake having a single port through which air passes for both service and emergency application of the brakes in combination with valve means for the port, and electromagnetic controlling means for the valve means adapted to be energized to varying degrees, said controlling means being adapted when energized to a certain degree to open the port sufficient for a service application, and when energized to another certain degree to open the port for emergency application.

3. A pneumatic electric air brake valve having an air port through which the air passes during application of the brakes, a valve controlling the port and a removable gage member in the port, independent of the walls of the port adapted to regulate the volume of air passing therethrough at any given pressure.

4. In a pneumatic brake, the combination with the triple valve, of an electrically controlled valve adapted to apply and release the brakes independently of the triple valve, but having a release port through which the air from the triple valve is adapted to pass on release, an electrically controlled release valve for said port and means independent of the electric controlling means for holding said release valve in open position.

5. In a pneumatic electric controlling valve for air brakes, in combination, a casing having an interior wall with port therein and opening in the exterior wall opposite the port, a valve for the port, an electromagnet having a movable core connected to the valve and withdrawable with the valve through the opening in the casing.

6. A pneumatic electric controlling valve for air brakes having a casing, valves therein, magnets controlling the valves and a separable two part electric connector in the casing, connected in circuit with the magnets.

7. A pneumatic electric controlling valve for air brakes having a casing, valves therein, magnets controlling the valves and a separable two part electric connector in the casing, connected in circuit with the magnets, and a fuse block in the casing having the fuses in circuit with the magnets.

8. A pneumatic electric controlling valve for air brakes having a casing, valves therein, magnets controlling the valves, a hinged door in the casing, a two part electric connector in the casing in circuit with the magnets having one part adapted to be withdrawn through the door.

9. In a pneumatic electric air brake, valve means formed in two sections controlling respectively the service and emergency application of the brakes, the section controlling the emergency application being spring seated and being adapted to be opened by a pressure in the requisite direction, greater than that required to open the service section and electromagnetic controlling means operatively connected to the valve.

10. In a pneumatic electric air brake, valve means formed in two sections controlling respectively the service and emergency application of the brakes, the section controlling the emergency application being spring seated and being adapted to be opened by a pressure on the requisite direction, greater than that required to open the service section and electromagnetic controlling means operatively connected to the valve, and means for energizing the electromagnetic means to varying degrees.

11. In a pneumatic electric air brake, a casing having a port and valve seat around the same, a valve formed in two sections, one of which is spring seated against the port and formed itself with a port, and the other section of which valve is adapted to seat against the last mentioned port, and means connecting the sections in such a way that the ports may be opened successively.

12. In a pneumatic electric air brake, a casing having a port and valve seat around the same, a valve formed in two sections, one of which is spring seated against the port and formed itself with a port, and the other section of which valve is adapted to seat against the last mentioned port, and means connecting the sections in such a way that the ports may be opened successively, the said first mentioned section being formed with a stem extending through the port, and a spring extending from the stem to the valve seat.

13. In a pneumatic electric air brake, controlling valves, electric circuits of varying resistance including means to actuate the valves and means for selectively completing the circuits.

14. A pneumatic electric air brake valve having an air port through which the air passes during application of the brake, a valve controlling the port and a gage member independent of the port and out of engagement with the valve adapted to regulate the volume of air passing therethrough at any given pressure.

15. In a pneumatic electric air brake system lifting valves adapted to open a given amount for service application of the brake, and a larger amount for an emergency application of the brake and means for effecting increased resistance to movement of the valve from service to emergency application positions, and electromagnetic means for controlling movement of the valve.

16. In a pneumatic electric air brake valve lifting valves adapted to open a given amount for service application of the brake, and a larger amount for emergency application of the brake, a spring adapted to offer increased resistance to movement of the valve from service to emergency positions, and electromagnetic means for operating the valve.

17. In an electric air brake valve, lifting valves adapted to open a given amount for service application of the brake, and a larger amount for emergency application of the brake, means for offering increased resistance to the movement of the valve from service to emergency positions, electromagnetic means for actuating the valve and means for varying the voltage in the electromagnetic means.

In witness whereof I have hereunto set my hand in the presence of two witnesses.

EDWARD RICHMOND HUMPHREY.

Witnesses:
K. RIDOUT,
W. H. MARSH.

Copies of this patent may be obtained for five cents each, by addressing the "Commissioner of Patents, Washington, D. C."